June 5, 1923.

B. BUSH

DIRECTION INDICATOR

Filed April 23, 1921

1,457,723

3 Sheets-Sheet 1

WITNESSES

INVENTOR
Burnett Bush.
BY
ATTORNEYS

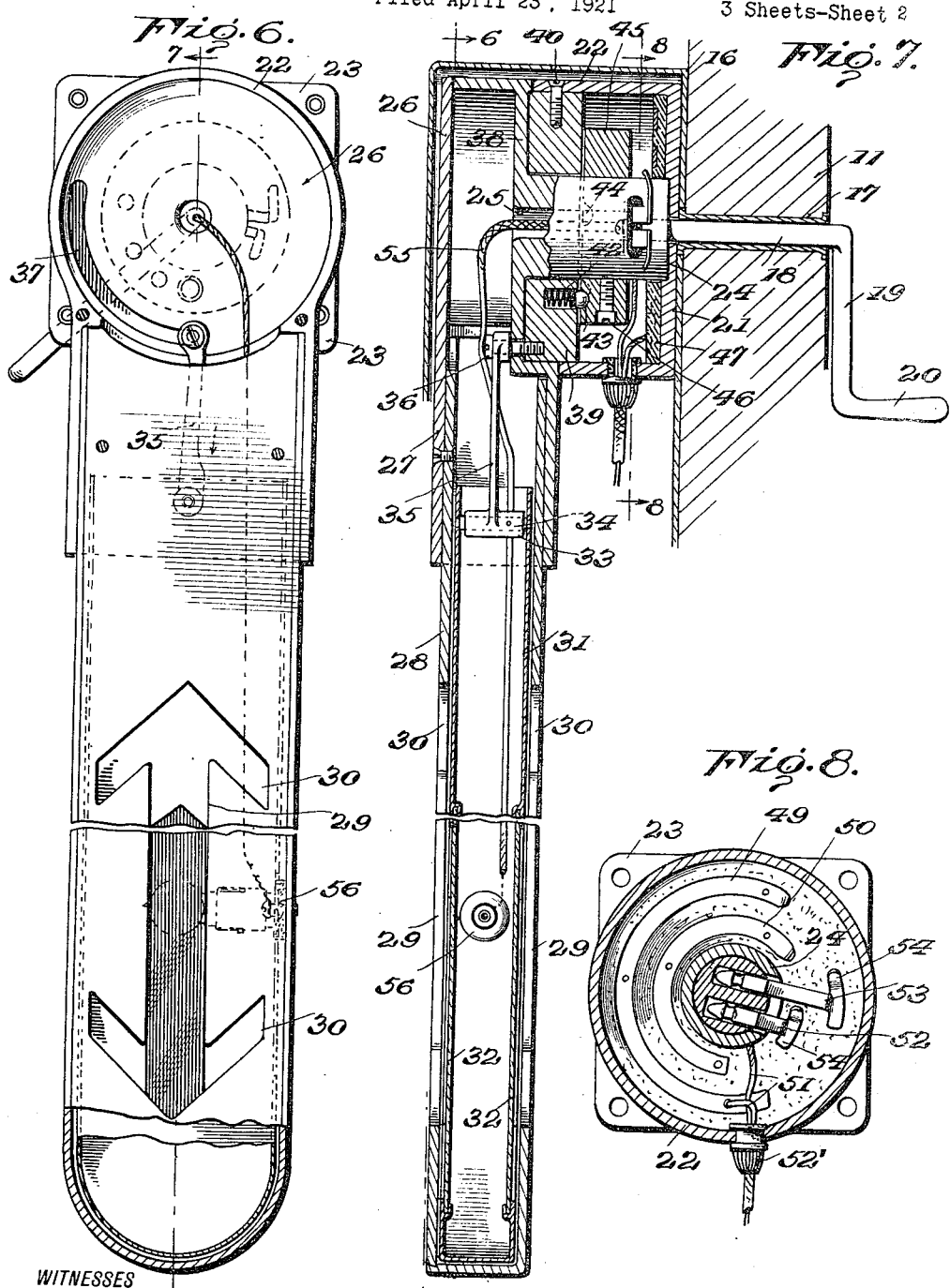

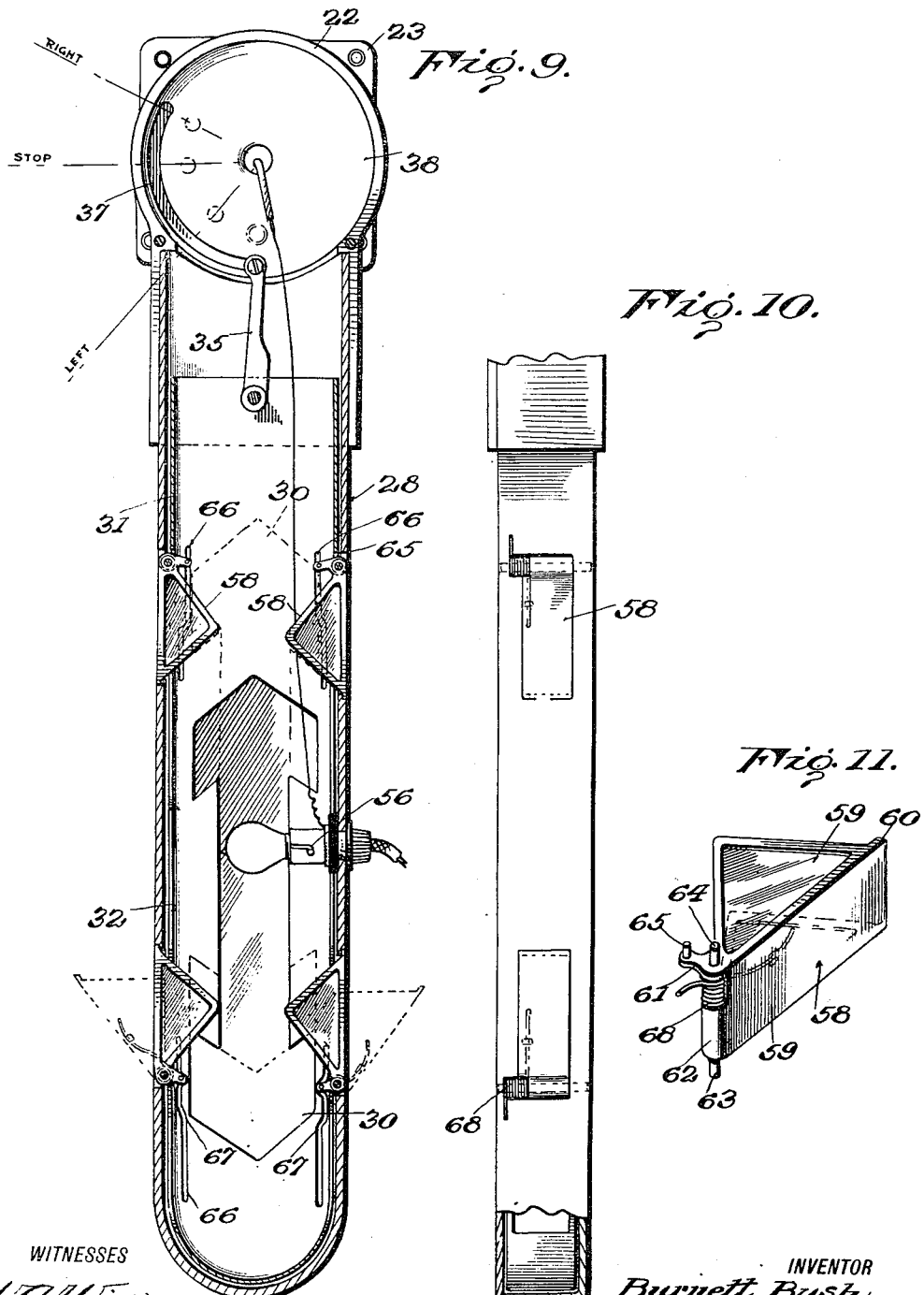

Patented June 5, 1923.

1,457,723

UNITED STATES PATENT OFFICE.

BURNETT BUSH, OF KENNEDY, NEW YORK, ASSIGNOR OF ONE-HALF TO A. C. KEPPLER, OF SOUTH BEND, INDIANA.

DIRECTION INDICATOR.

Application filed April 23, 1921. Serial No. 463,864.

*To all whom it may concern:*

Be it known that I, BURNETT BUSH, a citizen of the United States, and a resident of Kennedy, in the county of Chautauqua and State of New York, have invented certain new and useful Improvements in Direction Indicators, of which the following is a specification.

This invention relates to a direction indicator for automobiles or other vehicles.

The object of the invention is to provide a device which may be mounted upon any type of automobile, and adapted to be easily manipulated by the driver of the automobile with which it may be associated for indicating the course which he intends the automobile to proceed to anybody in the rear or forward of the automobile.

It is also an object of the invention that the indicator be adapted for signalling after darkness as well as during the day.

Other objects and objects relating to details of construction, combination and arrangement of parts will hereinafter appear in the detailed description to follow.

In carrying out the invention it is contemplated to pivotally mount an arm upon one side of an automobile which may be swung by the driver of the automobile in a vertical plane transverse to the direction of travel of the automobile, and to normally remain in a vertical and concealed position when not in use. With the arm there is associated means which will automatically operate to hold the arm in different angular positions with relation to the side of the automobile; also means which will visually signal to any one forward or to the rear of the automobile an intention of the driver with respect to turning or stopping the automobile at a time simultaneous with the arm, assuming any of the angular positions in which it may be held.

Figure 1:
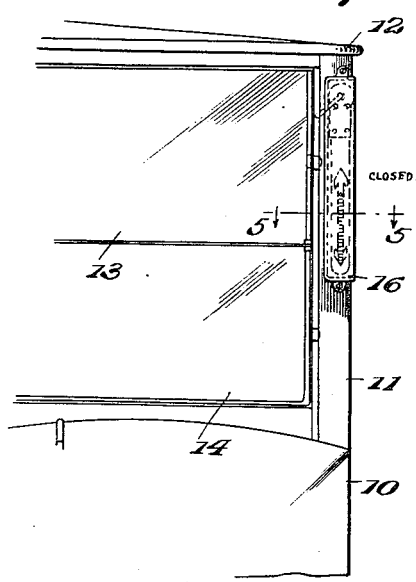
Figure 2:
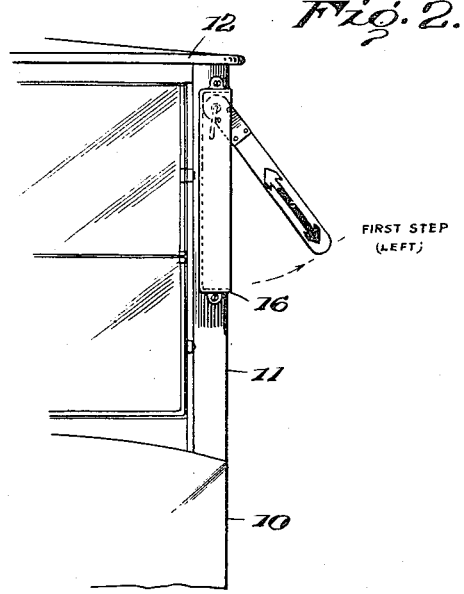
Figure 3:
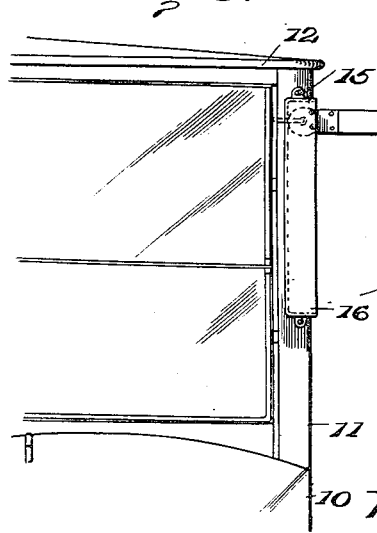
Figure 4:
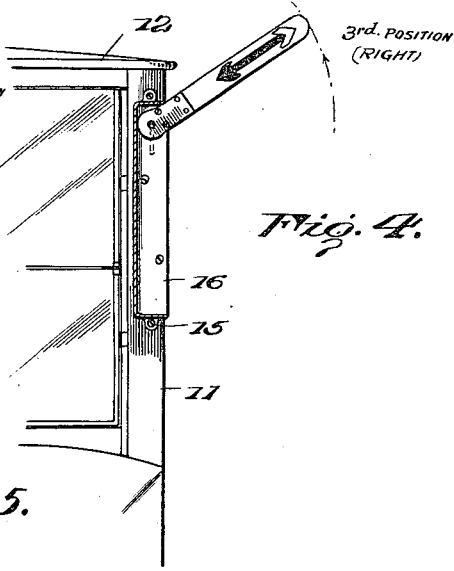
Figure 5:
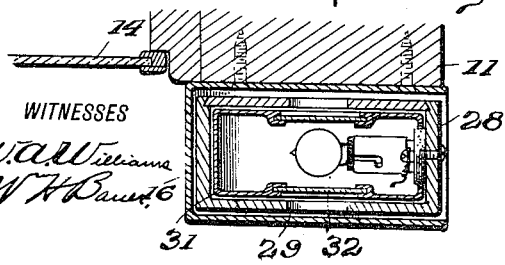

The invention is illustrated by way of example in the accompanying drawings, in which:

Figure 1 is a detail front elevation of an automobile illustrating my invention applied to a wind shield standard or frame support, the same being in its non-signalling or concealed position, Figures 2, 3, and 4 are views similar to Figure 1, and showing the arm in its different signalling positions, Figure 5 is a transverse section taken substantially on the lines 5—5 of Figure 1, Figure 6 is a longitudinal sectional view of the device taken substantially on the lines 6—6 of Figure 7, Figure 7 is a central longitudinal section of the device taken substantially on the lines 7—7 of Figure 6, Figure 8 is a transverse section taken on the lines 8—8 of Figure 7, Figure 9 is a view similar to Figure 6, but showing a modification of my invention, Figure 10 is a partial end elevation of Figure 9, Figure 11 is an enlarged detail view of an arrow head extension element.

Referring to the drawings in detail, and particularly to Figures 1 to 8 inclusive, 10 indicates the body of an automobile, 11 a frame or wind shield support, 12 the top, and 13 and 14 the upper and lower wind shield sections respectively.

Upon the forward face of the support 11, there is secured by means of screws 15 a casing 16, said casing being rectangular in cross section and having its outer side open as shown. In the upper portion of the support 11 there is positioned a journal sleeve 17, Figure 7, adapted to journal the horizontal portion 18 of the crank 19, said crank being formed with a handle 20, by which its portion 18 may be rotated. The forward end of the horizontal crank portion 18 extends through the rear wall of the casing 16, and in the upper end thereof. The end of the crank portion 18 also passes centrally through the rear end 21 of a cylindrical casing 22, said casing being open at its forward end and also having lugs 23 formed about its closed end 21 by which it may be secured to the support 11 through the means of screws, as shown.

Upon the end of the crank portion 18 there is carried a cylindrical member 24, said member being formed with a central longitudinal bore 25 in the rear end of which the crank pin 18 extends, and is secured. Upon the forward end of the cylindrical member 24 there is formed an annular casing 26, which has a communicating radial arm portion 27 formed therewith. The arm portion 27 is rectangular in cross section, and has fitted therein an extension arm 28 which is likewise hollow and has formed in its rear and forward sides a longitudinally extending slot 29, said slot in each instance terminating at its ends in an arrow head 30. Within the extension arm 28 there is slidingly fitted an elongated rectangular shaped casing 31, the front and rear sides of which are longitudinally recessed near the outer ends thereof, and said recesses covered by a strip of red celluloid sheeting 32, the celluloid strips being adapted to register longitudinally of the slots 29 and arrow heads 31, Figure 5.

In the upper end of the member 31 there is positioned transversely thereof a pin upon which is journaled a hub sleeve 33, said sleeve being provided with an oil hole 34, and having formed therewith a radial arm 35. The upper end of the radial arm 35 is journaled by a machine bolt 36 which extends through an arcuate slot 37 formed in the inner wall 38 of the casing 26, and said screw being threaded into a collar 39 which is loosely fitted upon the cylindrical member 24. The diameter of the collar 39 is substantially the same as the inner diameter of the cylindrical casing 22, and the collar is secured to said casing by the means of a set screw as indicated at 40. The collar 39 is formed with an opening extending parallel with the longitudinal axis of the cylindrical member 24, and positioned in said opening is a compression spring 42 having its one end secured to a ball 43. The ball 43 is adapted to seat in either of the hemispherical recesses 44, which are formed in the forward face of a collar 45, said collar being secured upon the cylindrical member 24 by the means of a set screw 46. The recesses 44 are three in number, and circumferentially spaced, as shown.

That heretofore described comprises the operative mechanical elements of the present invention, and the operation thereof will be later described in detail. There is also provided an electrical arrangement for illuminating the signal during darkness, and it constitutes an annular insulated member 47 which is secured to the inner face of the end 21 of the cylindrical casing 22, and carries upon its forward face a pair of segment slip rings 49 and 50. To each segment 49 and 50, there is connected a wire 51, said wires extending through a nipple 52' positioned in the wall of the cylindrical casing 22 and from thence to a suitable source of electrical current supply, not shown. A pair of terminal posts 52 and 53 are extended through suitable openings formed in the cylindrical member 24 and into the outer end of the horizontal crank portion 18, the posts being secured in the crank portion 18 and insulated therefrom and from each other.

Each post carries on its outer end a brush 54, the brush carried by the post 52 being adapted to contact with the slip ring segment 50, while the brush on the post 53 is adapted to contact with the slip ring segment 49. To the inner end of each post 52 and 53 there is suitably secured the one end of a wire, said wires constituting a cable 55 which is led to a lamp 56, located in the lower end of the extension arm 28, the wires of the cable 55 being suitably connected for energizing the light 56.

In the operation of the present device, as before stated, the signal arm 28 is normally in its vertical position as shown in Figure 1, and the brushes 54 of the posts 52 and 53 do not contact with the ring segments 49 and 50, as shown in Figure 8. Consequently the lamp 56 at this time is not energized. Also at this time the ball 43 does not engage in either of the hemispherical recesses 44 in the collar 45. When it is desired on the part of the operator of the automobile, to signal his intention of turning to the left, it is only necessary for him to manipulate the crank 19 for swinging the arm 28 into the position shown in Figure 2. At this time the ball 43 will engage with the first of the hemispherical recesses 44 in the collar 45 and yieldingly hold the arm in this position. At the same time the screw 36 will be moved through the arcuate slot 37 and carry with it the radial arm 35, said arm in turn drawing upwardly upon the member 31. In other words the member 31 will move upwardly or inwardly simultaneously with the swinging movement of the arm 28. The upward movement of the member 31 will carry with it the celluloid strips 32 and move them from the position as shown in Figure 6 to the position as shown in Figure 2 at which time they will cause the lower arrow head recesses 30 to be covered thereby and also the slots 29. Thus it will be indicated to anyone forward of the automobile and likewise any body rearward of the automobile that it is the intention of the driver to turn to the left.

Simultaneously with the movement of the crank 19 for swinging upwardly the arm 28, the brushes 54 will be brought to engage with the slip ring segments 49 and 50 and energize the light 56. It may be mentioned that the light 56 will be energized as long as the arm 28 is in its raised position.

Now when it is desired on the part of the driver to signal his intention of stopping, then he should rotate the crank 19 for bringing the arm 28 to a horizontal position as illustrated in Figure 3. At this time the ball 43 will engage in the second hemispherical recess 44 and yieldingly hold the arm in this position. Also at this time the crank arm 35 will likewise draw further upwardly the member 31 so that its celluloid strips 32 are entirely disposed within the length of the slots 29 in the arm 28, and there will then be visually presented to anyone in the rear or forward of the automobile a signal bar as clearly shown in Figure 3.

When it is desired on the part of the driver to signal his intentions of turning to the right, then he will further rotate the crank arm 19 to swing the arm 28 into the position shown in Figure 4. At this time the celluloid strips 32 have moved to a position so that the upper arrow head recesses 30 are covered thereby. The arrow then disclosed to those forward or in the rear of the automobile will point in the right hand direction, and thus clearly indicate the intention of the driver.

Referring to Figures 9 to 11 inclusive, in which I have shown modifications of my invention, the device disclosed is constructed in the same manner as that heretofore described with the exception that I provide means whereby the arrow heads at the time of signalling are enlarged. In carrying out this construction I provide four arrow head extension elements 58 as shown in detail in Figure 11, said elements comprising a triangular shaped casing as shown, two of the side walls being recessed and having said recesses covered by the means of red celluloid sheeting as indicated at 59. Also the base portion of this casing is slightly extended at its one end as at 60, and the other end of which is formed with a pair of extensions 61 between which there is formed a cylindrical member 62; also upon each extension 61 there is formed a stud as indicated at 63 and 64. Likewise there extends from one of the extensions a radial arm which carries a stud 65. The forward sides of the arm 28 and the member 31 are formed with registering recesses as at 65' which are adapted to receive an arrow head extension member 58. A pair of these registering recesses are formed for each of the arrow head recesses 30 so that there may be a pair of arrow head extension elements 58 provided for each arrow head recess 30. The studs 63 and 64 of each element 58 are journaled in the side walls of the casing 28 and adapted to permit the element 58 to be swung inwardly and outwardly. In the inner side wall of the member 31, there is formed a plurality of slots 66, one for each of the arrow head extension elements 58, and through each of these slots 66, a stud 65 of the associated arrow head extension element 58, is adapted to extend. Also in each of the slots 66 there is formed a slight offset as at 67, the purpose of which will later be made evident, and also each of the cylindrical members 62 of the arrow head extension elements 58 has encircled thereabout a coil spring 68, the outer end of said coil spring being suitably secured to the arm 28. The purpose of these coils is to normally hold the arrow head extension element 58 in the position as shown in Figure 9, the extensions 60 of each arrow head extension limiting the inward movement of said elements, as illustrated in Figure 9.

In the operation of the modified form of my invention, as described, the arm 28 is swung for bringing the same in its different signalling positions in the same manner as described for Figures 1 to 8 inclusive. Also the member 31 moves upwardly and downwardly in a similar manner. When this member has moved upwardly so that the celluloid strips 32 are disposed for covering the slots 29 and the lowermost arrow head recesses 30, as shown in Figure 2, the offsets 67 of the lowermost slots 66 will engage with the studs 65 and swing the arrow head extension elements 58 in a position as indicated in dotted lines in Figure 9, thus forming an extension for these arrow heads so that the signal may be visible at a greater distance.

When the arm 28 is swung to its horizontal position as shown in Figure 3, these arrow head extensions will be permitted to return to their normal position, and then only the slots 29 will be visible. When the arm 28 is swung to its uppermost position for signalling the intention of the driver to turn to the right as shown in Figure 4, then the offsets 67 of the uppermost slots 66 will engage with the associated studs 65 and swing the upper arrow head extension elements to a position similar to that described for the lower arrow head extension elements. In this instance the arrow will point to the right and the intention of the driver be made known.

I claim:—

1. A direction indicator for automobiles, comprising in combination a hollow arm having its one end pivoted to a wind shield standard of an automobile, and having its forward and rear side formed with a slot, each end of said slot terminating in an arrow head, a member slidable within said arm, means to cause said slidable member to move within the arm when said arm is swung upon its pivot, and means carried by said slidable member adapted to cooperate with the slots and arrow heads in said arm to give a plurality of signals during the swinging movement of the arm.

2. A direction indicator for automobiles, comprising in combination, an arm rectangular in cross section and having two of its sides formed with a longitudinal slot, said slots terminating at each of their ends in an arrow head, means for pivoting one end of the said arm to a wind shield standard of the automobile so that the same may be swung in a vertical plane transverse to the direction of travel of the automobile, an elongated member slidable in said arm and having its one end connected to a fixed point, so that when said arm is swung, said member will simultaneously move within the arm, and signal means carried by said slidable member adapted to cooperate with said slots and arrow heads to cause a plurality of signals to be given during the upward swinging movement of said arm.

3. A direction indicator for automobiles, comprising in combination, an arm rectangular in cross section and having two of its sides formed with a longitudinal slot, said slots terminating at each of their ends in an arrow head, means for pivoting one end of the said arm to a wind shield standard of the automobile so that the same may be swung in a vertical plane transverse to the direction of travel of the automobile, an elongated member slidable in said arm and having its one end connected to a fixed point, so that when said arm is swung, said member will simultaneously move within the arm, and signal means carried by said slidable member adapted to cooperate with said slots and arrow heads to cause a plurality of signals to be given during the upward swinging movement of said arm, and means by which said arm may be concealed when extending in a downward and vertical position.

4. A direction indicator for automobiles, comprising in combination, an arm rectangular in cross section and having two of its sides formed with a longitudinal slot, said slots terminating at each end in an arrow head, means for pivoting one end of the said arm to a wind shield standard of the automobile so that the same may be swung in a vertical plane transverse to the direction of travel of the automobile, an elongated member slidable in said arm and having its one end connected to a fixed point, so that when said arm is swung, said member will simultaneously move within the arm, and signal means carried by said slidable member adapted to cooperate with said slots and arrow heads to cause a plurality of signals to be given during the upward swinging movement of said arm, and colored translucent strips carried by said slidable member which are adapted to cooperate with said slots and arrow heads of the arm to give a plurality of signals during the swinging movement of said arm.

5. A direction indicator for automobiles, comprising in combination, an arm rectangular in cross section and having two of its sides formed with a longitudinal slot, said slots terminating at each end in an arrow head, means for pivoting one end of the said arm to a wind shield standard of the automobile so that the same may be swung in a vertical plane transverse to the direction of travel of the automobile, an elongated member slidable in said arm and having its one end connected to a fixed point, so that when said arm is swung, said member will simultaneously move within the arm, and signal means carried by said slidable member adapted to cooperate with said slots and arrow heads to cause a plurality of signals to be given during the upward swinging movement of said arm, and colored translucent strips carried by said slidable member which are adapted to cooperate with said slots and arrow heads of the arm to give a plurality of signals during the swinging movement of said arm, and means by which the translucent strips may be illuminated when signalling.

6. A direction indicator for automobiles, comprising in combination, an arm rectangular in cross section and having two of its sides formed with a longitudinal slot, said slots terminating at each of their ends in an arrow head, means for pivoting one end of the said arm to a wind shield standard of the automobile so that the same may be swung in a vertical plane transverse to the direction of travel of the automobile, an elongated member slidable in said arm and having its one end connected to a fixed point, so that when said arm is swung, said member will simultaneously move within the arm, means for engaging and yieldingly holding said arm in different angular positions with relation to a plane corresponding to the side of the automobile, and means carried by said movable member adapted to cooperate with said slots and arrow heads of the arm to cause the signal to be given simultaneously with the arm assuming either of its positions in which it may be yieldingly held.

7. A direction indicator for automobiles, comprising in combination, an arm rectangular in cross section and having two of its sides formed with a longitudinal slot, said slots terminating at each of their ends in an arrow head, means for pivoting one end of the said arm to a wind shield standard of the automobile so that the same may be swung in a vertical plane transverse to the direction of travel of the automobile, an elongated member slidable in said arm and having its one end connected to a fixed point, so that when said arm is swung, said member will simultaneously move within the arm, means for engaging and yieldingly holding said arm in different angular positions with respect to a plane corresponding to the side of the automobile, and means carried by said movable member adapted to cooperate with said slots and arrow heads of the arm to cause the signal to be given simultaneously with the arm assuming either of its positions in which it may be yieldingly held, and crank means by which said arm may be manually manipulated from the driver's seat of the automobile.

8. In a signal apparatus of the character described, an arm pivotally supported at its one end for swinging movement, a member longitudinally movable of said arm, a connection between the end of said member corresponding to the pivoted end of said arm and a fixed support whereby with the swinging movement of said arm the member will move longitudinally of the arm, and movable means carried by said arm adapted to be actuated by said movable member for signalling when the arm is in different positions relative to its swinging movement.

9. In a signal apparatus of the character described, an arm pivotally supported at its one end for swinging movement, a member longitudinally movable of said arm, a connection between the end of said member corresponding to the pivoted end of said arm and a fixed support whereby with the swinging movement of said arm the member will move longitudinally of the arm, and signal members movably supported by said arm and adapted to be actuated by the movement of said member for causing different signals during the swinging movement of said arm.

10. In a signal apparatus of the character described, an arm pivotally supported at its one end for swinging movement, a member longitudinally movable of said arm, a connection between the end of said member corresponding to the pivoted end of said arm and a fixed support whereby with the swinging movement of said arm the member will move longitudinally of the arm, and signal elements pivotally supported by said arm adapted to be actuated by the movement of said member for causing different signals during the swinging movement of said arm.

11. In a signal apparatus of the character described, an arm pivotally supported at its one end for swinging movement, a member longitudinally movable of said arm, a connection between the end of said member corresponding to the pivoted end of said arm and a fixed support whereby with the swinging movement of said arm the member will move longitudinally of the arm, and a plurality of casings having transparent walls pivotally supported by said arm and adapted to be swung from said arm for giving signals during different intervals in the swinging movement of said signal arm, said casings being actuated by the movements of the first named member carried by said arm.

12. In a device of the character described, a hollow arm having its one end pivoted to permit swinging movement of said arm, a member movable longitudinally and within said arm and said member having slots in the sides thereof and said movable member having a longitudinally extending slot in each side thereof terminating in an arrow head, a connection between the end of the movable member corresponding to the pivoted end of the arm and a fixed support whereby to permit the member to move longitudinally of the signal arm with the swinging movement of said signal arm, and said signal arm having slots in its side walls with which the slots of the movable member may be brought into register, said slots in the signal arm corresponding in shape to the slots of the movable member but of greater length, and means whereby upon the movable member moving so that either of the heads of the slots are in register with one of the arrowheads in the side walls of the signal slot said arrowheads will be enlarged for the purpose described.

13. In a signal apparatus of the character described, a signal arm pivoted at its one end for swinging movement, said signal arm being in the form of a casing and having a slot in each side wall thereof extending longitudinally of the arm and terminating at each end in an enlargement, and means whereby the interior of casing will be illuminated and light rays projected through each slot and one enlargement at the end thereof during the period the arm is adjacent one extreme position, through both slots during the intermediate position of the arm, and through each of said slots and the head at the other end thereof at the other extreme position.

BURNETT BUSH.